Sept. 5, 1933.                C. P. BURGESS                1,925,133
                                 AIRCRAFT
                         Filed Dec. 10, 1931     5 Sheets-Sheet 1
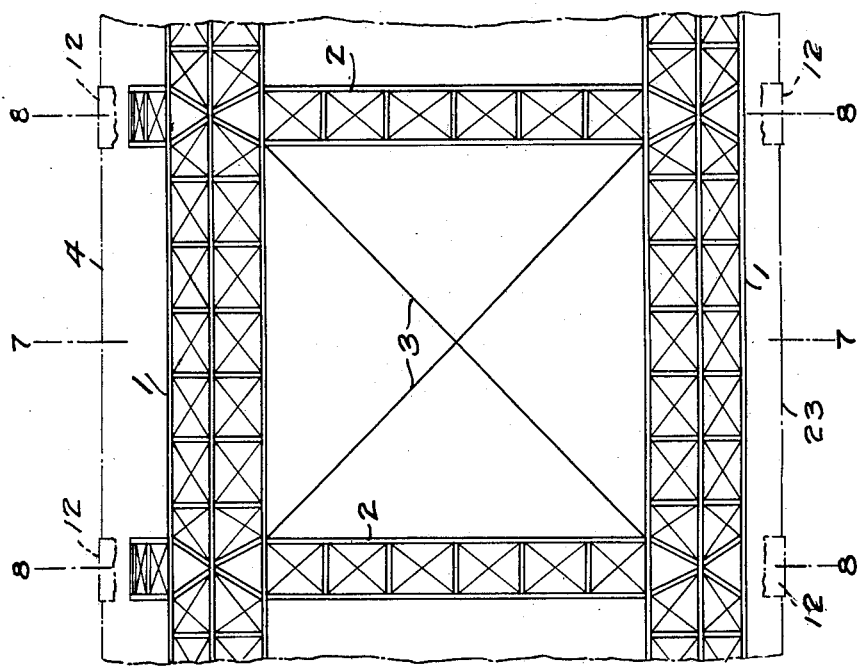
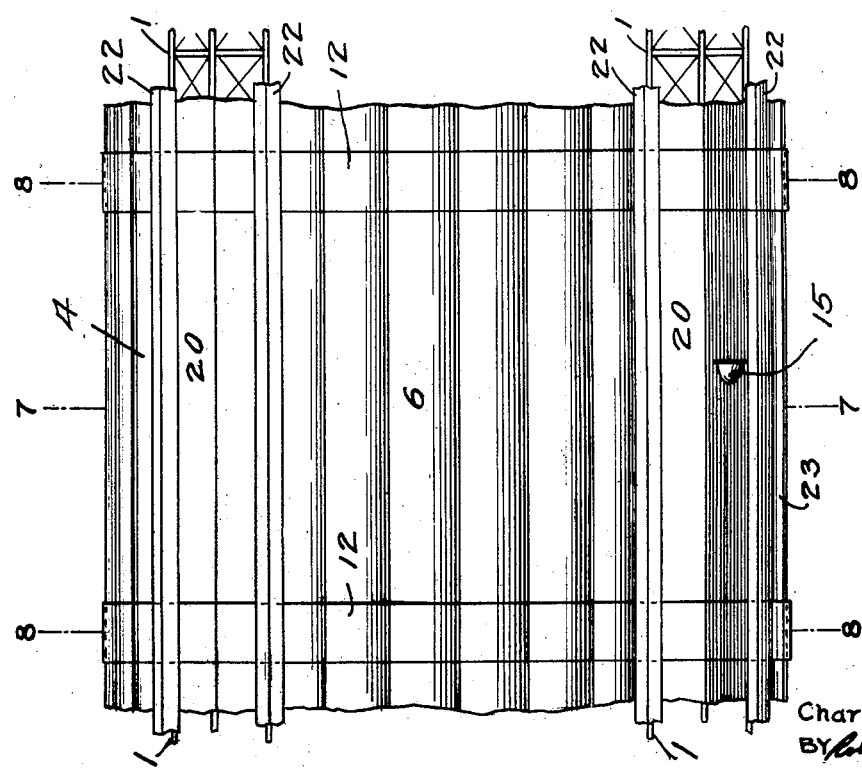
INVENTOR
Charles P. Burgess
BY
ATTORNEY Sept. 5, 1933.  C. P. BURGESS  1,925,133
AIRCRAFT
Filed Dec. 10, 1931   5 Sheets-Sheet 2

INVENTOR
Charles P. Burgess
BY *Robert A. Lavender*
ATTORNEY

Sept. 5, 1933.  C. P. BURGESS  1,925,133
AIRCRAFT
Filed Dec. 10, 1931  5 Sheets-Sheet 3

INVENTOR
Charles P. Burgess
BY
ATTORNEY.

Sept. 5, 1933.  C. P. BURGESS  1,925,133
AIRCRAFT
Filed Dec. 10, 1931  5 Sheets-Sheet 4
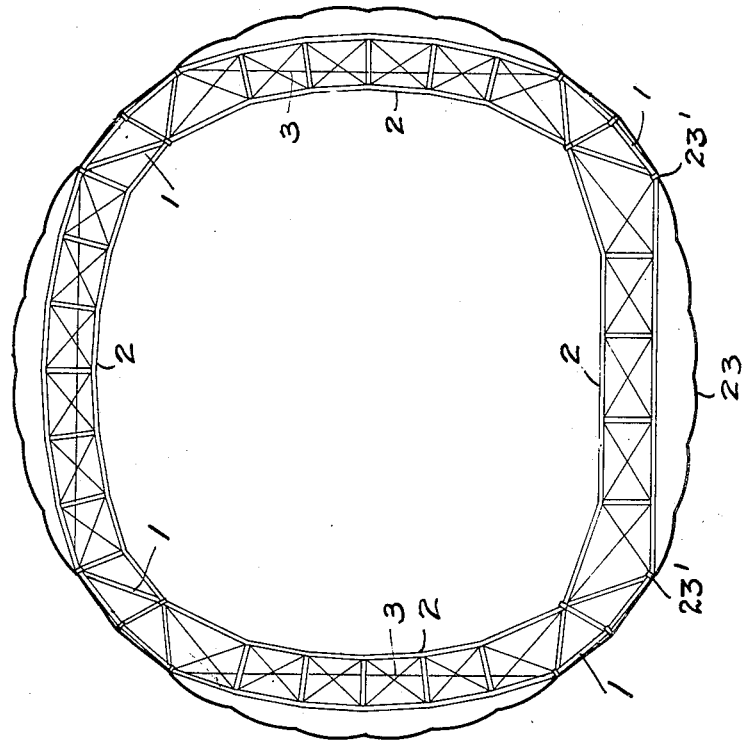
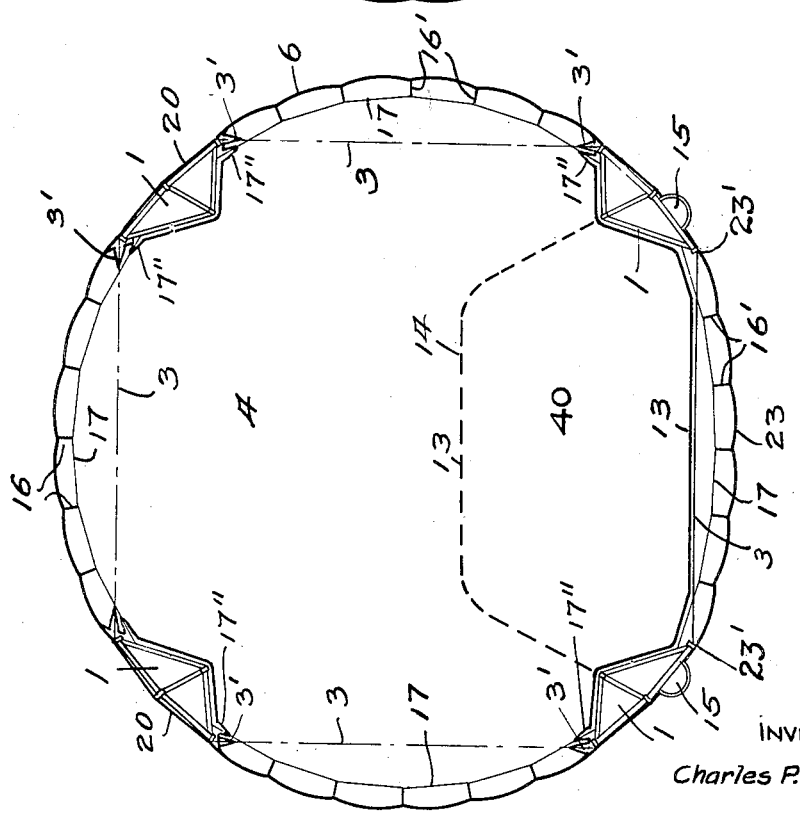
INVENTOR
Charles P. Burgess
BY
ATTORNEY.

Sept. 5, 1933. C. P. BURGESS 1,925,133
AIRCRAFT
Filed Dec. 10, 1931 5 Sheets-Sheet 5
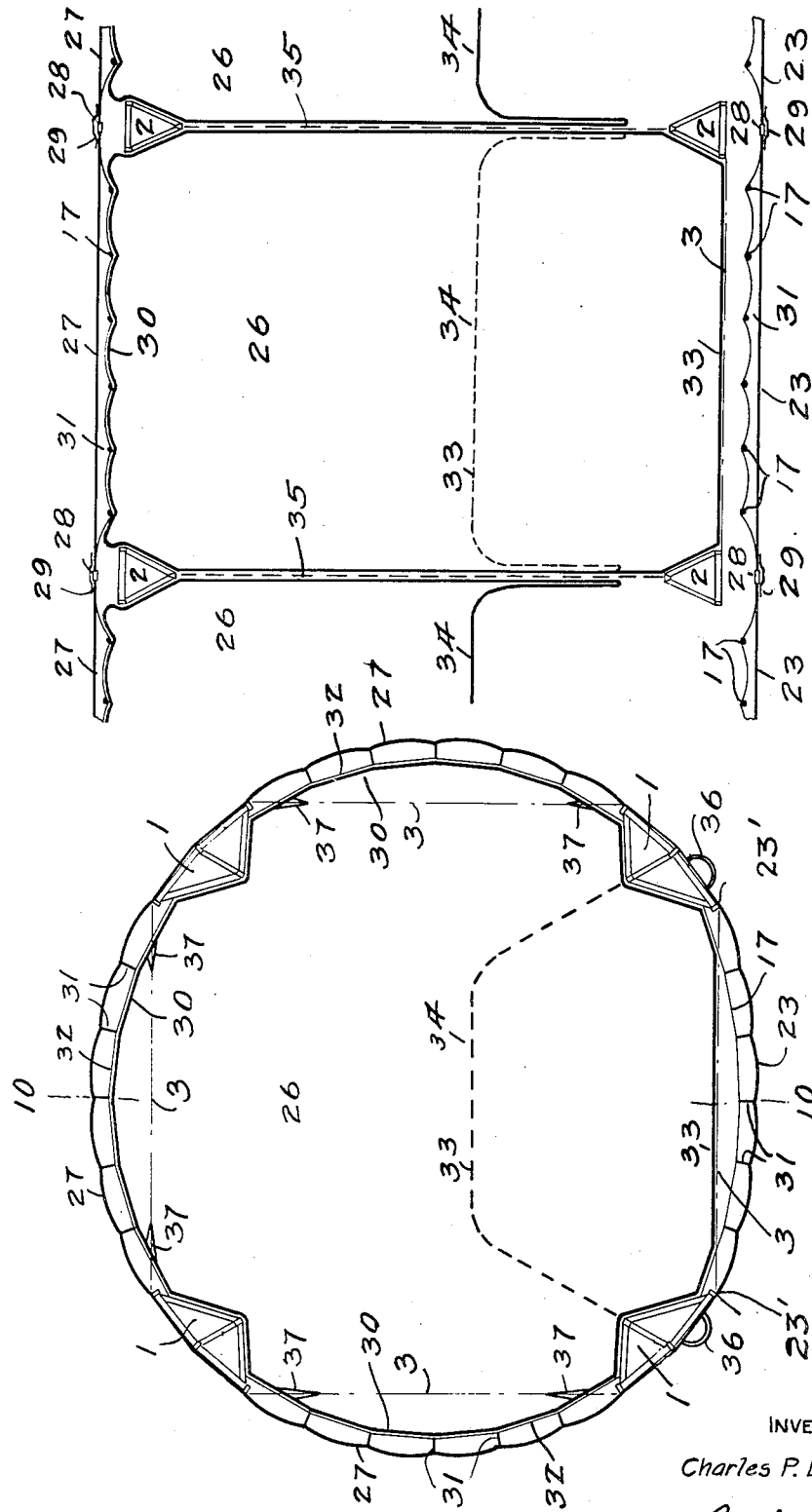
INVENTOR
Charles P. Burgess
BY
ATTORNEY.

Patented Sept. 5, 1933

1,925,133

UNITED STATES PATENT OFFICE 1,925,133

AIRCRAFT

Charles P. Burgess, Bethesda, Md.

Application December 10, 1931
Serial No. 580,187

13 Claims. (Cl. 244—3)

(Granted under the Act of March 3, 1883, as amended April 30, 1928; 370 O. G. 757)

My invention relates broadly to airships, and more particularly to a novel construction and design of dirigible of the rigid type.

The primary object of my invention is to provide an airship of the rigid type wherein the frame structure will support the main loads and the pressure within the gas cells is only required to be sufficient to prevent local distortion to the outer surface or envelope, and that the strength and safety of the same is not dependent upon maintenance of pressure from within.

In the practice of rigid airship construction heretofore it has been the custom to employ numerous principal and secondary, or more commonly referred to main and intermediate longitudinal, girders and main and intermediate frames located at close intervals to preserve the contour and support the outer envelope and gas cells, thus resulting in a complicated and costly structure, with a considerable degree of uncertainty as to the distribution of stresses as well as excessive weight and loss of gas cell space.

An object of my invention is to provide a novel construction for dirigibles in which the secondary structural members or intermediate frame members are omitted.

Another object of my invention is to provide an airship or dirigible of the rigid type with gas cell compartments which serve both as gas containers, and reinforcements for supporting the outer covering or envelope.

A further object is to include provision for an airship of the rigid type of construction with gas compartments which will serve as gas containers and as an outer covering or envelope combined.

A further object of my invention is to provide the gas cells of a rigid airship with local reinforcement consisting of longitudinal catenary bands secured to the gas cells lengthwise of the same, and adjustable wires running circumferentially at the points of intersection of the curvatures of the catenary bands for the purpose of preserving the contour of the airship.

Another object of my invention is to incorporate a means for insuring a taut contour within safe limits to the airship regardless of varying gas pressure, by the provision of air ballonets which automatically compensate for the varying gas volume.

Another object of my invention is to provide a novel arrangement of gas cells in a rigid airship, consisting of a series of cylindrical gas containers secured together at their ends to form an outer envelope, each gas container having flexible concave end bulkheads, with air compartments beneath, and a series of gas compartments formed by the end bulkheads and located between each of said cylindrical gas containers, and air chutes to admit air to uniformly maintain pressure within the gas cells.

With the above and other objects in view the invention consists in the construction, combination and arrangement of parts as will be described more fully hereinafter.

Reference is made to the accompanying drawings forming a part of this specification in which like reference characters indicate corresponding parts throughout the several views, and in which:

Fig. 1 is a view in side elevation of a portion of an airship between two transverse frames, showing my combined gas cell and outer envelope in position;

Fig. 2 is a similar view showing the rigid frame structure, but with the gas cell removed;

Fig. 7 is a transverse section applicable to the lines 7—7 of Figs. 1, 2, 3 and 4, but showing the gas cell fully inflated in full lines, and the maximum or highest position of the air or compensating ballonet in dotted lines;

Fig. 8 is a transverse section of the lines 8—8 of Figs. 1, 2, 3 and 4;

Fig. 9 is a transverse section of an airship showing a slightly modified form of construction of my invention in which the gas cells are provided with an air inflated space between the cell and the outer cover;

Fig. 10 is a central longitudinal section on the line 10—10 of Fig. 9.

Figure 4:
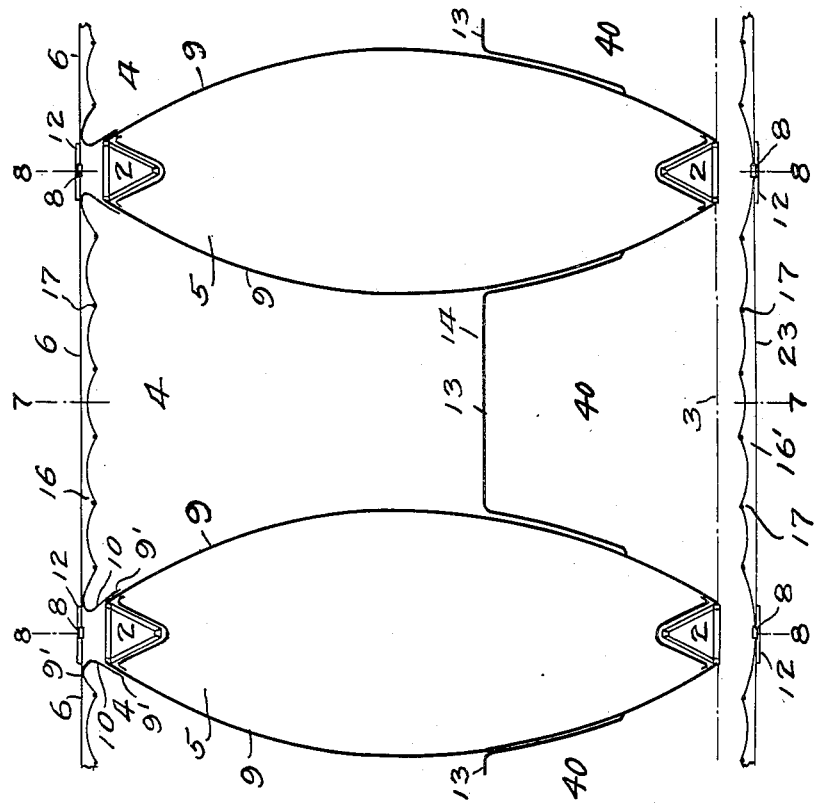
Fig. 4 is a view in section similar to Fig. 3, but showing one cell partly deflated of gas, but still taut under compensated pressure of adjacent cells and air ballonets.

Referring more particularly to the drawings, 1 indicates the longitudinal frame members, while 2 indicates the transverse frame members which are made up of structural members and comprise triangular girders made up of apex and base channels or angles or struts or lattices and brace connections. The wires 3 are secured at the intersections of the frame members 1 and 2 on each side of the transverse frames. The wires 3 located at the top and sides of the frame pass through the cylindrical cells 4 and are provided with gas tight fabric sleeves 3'.

It is to be understood that while I have shown for illustration a parallel portion of an airship between two of the transverse frames, that I contemplate repeating the same along approximately the entire length of a streamline shaped airship.

The gas compartments are alternately arranged so as to form the cylindrical gas cells 4, located between the transverse frames 2 and alternate lens-shaped gas cells 5 located at the transverse frames 2.

The cylindrical gas cells 4 are made of strong multiple-ply balloon fabric sections 6, which are provided at their edges with flaps 7 having lacing eyelets 7', through which lacing 8 is threaded to join the sections 6 end to end, and thus form a continuous outer envelope. The concave bulkheads 9 made of balloon fabric primarily form the ends of cells 4 and by application of the sections 10 made of fabric, also constitute the end sections of the lens-shaped gas compartments or cells 5. The section 10 being secured to both the bulkhead 9, and to the section 6 so as to form a gas tight connection as at 9'. The bulkheads 9 are provided at the outer edges with lacing eyelets 11 so that they can be laced to join up the gas cells 4 and 5 to the transverse frame members 2 with the lacings 11' as shown more clearly in Fig. 6.

After the gas cells have been secured in position by means of the lacings 8, sealing strips of fabric 12 are cemented over the eyelets and lacing so as to insure a smooth outer surface to the envelope thus formed.

Figure 3:
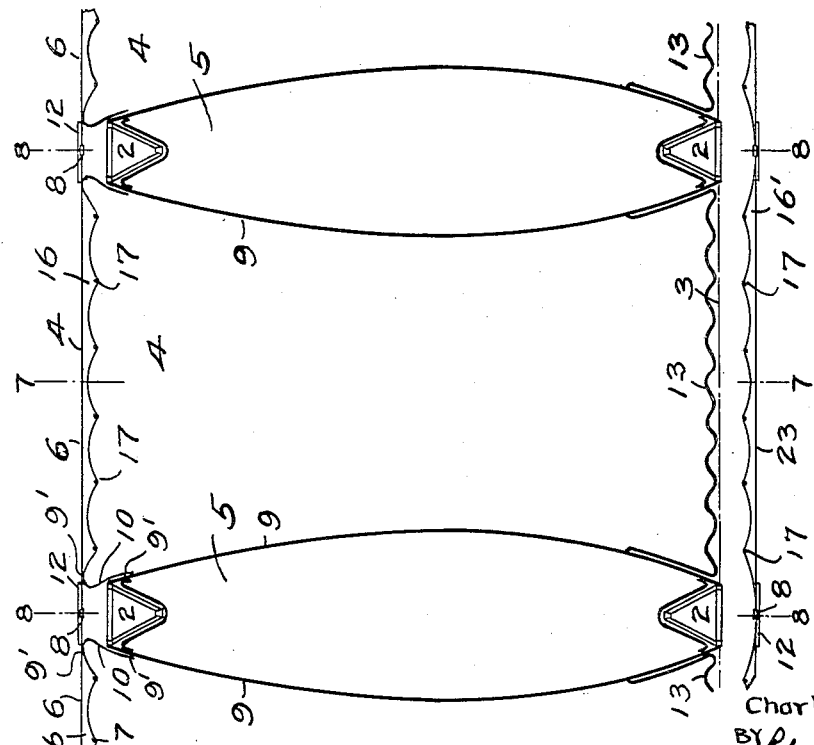
Fig. 3 is a central longitudinal section showing the combined cells and outer envelope in position and fully inflated with gas.

The bottoms 13 (see Figs. 3, 4 or 7), of the cylindrical gas cells 4 are left free so as to form with the bottom 23 of the outer covering, air ballonets 40, which may be free to rise to the position shown at 14, or may fall due to internal gas pressure until they rest along the diagonal shear wires 3 located at the bottom 23 as shown in Fig. 3. Air for equalizing the pressure within is admitted through the air chutes 15 to the ballonets formed by the loose bottoms of the cells 4 previously described so as to maintain a uniform pressure of the airship, and compensate for the varying volume of gas in the cells 4 and 5. These air chutes are located at intervals throughout the length of the airship, preferably along the lower girders of the longitudinal frame members 1 with their open end facing in the direction of the nose of the airship.

To localize the load stresses of the airship, the cells 4 are reinforced by the longitudinal catenary bands 16 which are secured lengthwise of the cell. The bulging of the cells in the fore and aft directions of the airship is prevented by a series of adjustable circumferential wires 17 located at intervals along the bands 16 at the intersections of the radius curves formed along the said bands 16.

The adjustment of the wires 17 being accomplished by the application of turnbuckles or the like 17' preferably located so that access for adjustments and inspections can be made from the outside of the girders before the cover strips 20 are secured in place.

Adjustments of the members 17' will result in the conformity of the contour of the airship since these are attached to the wires 17 which are also secured to the catenary reinforcing bands of the outer cells 4.

Figure 5:
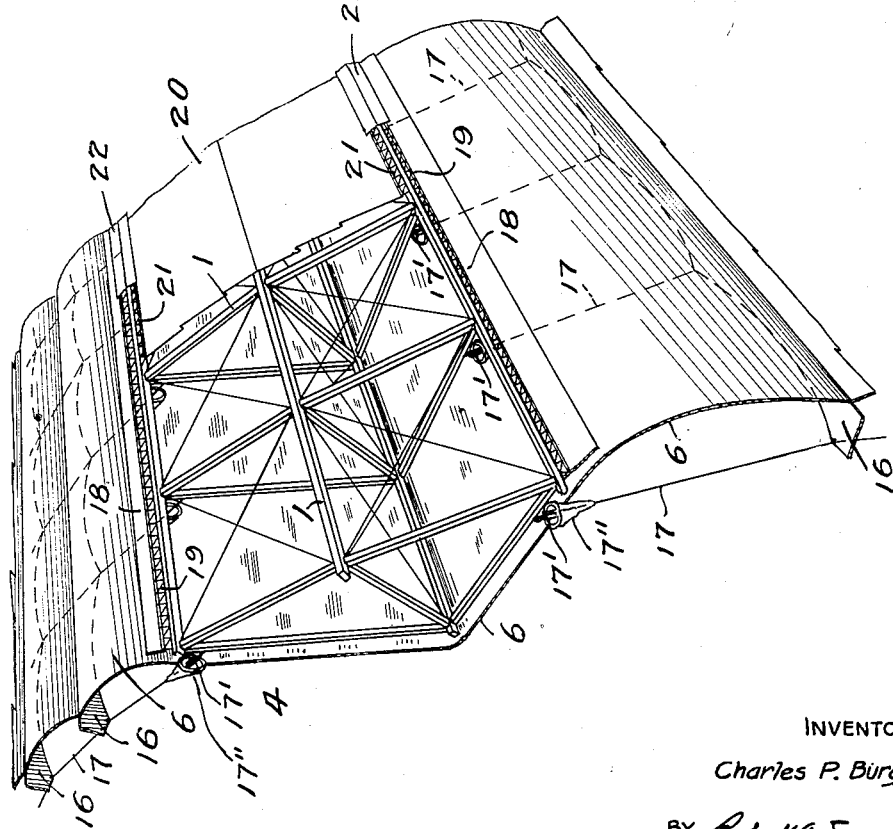
Fig. 5 is a fragmentary perspective view showing the arrangement of a portion of the longitudinal frame structure and gas cell.

The outer sections 6 of the gas cells 4 are arranged so as to project to the outer circumference of the airship and form the envelope in my preferred form between the longitudinal girders 1, and also pass under the said girders, (see Fig. 5), and are provided with flaps 18 which extend parallel to the girders 1, and are connected by lacing 19. After the cells are assembled in position the area covered by the girders 1 is closed up with strips of fabric 20 which are secured by lacing 21, and a sealing strip 22 is cemented over both of the lacings 19 and 21 to present a smooth outer appearance.

The outer envelope portions forming the bottoms 23, extend from point 23' at the lower edges of the girders of the longitudinal frame members 1, and between each of the transverse frames 2, and are made of strong multiple ply balloon fabric sections corresponding to the material of the upper portion of the envelope.

These sections are provided with eyelets along the longitudinal edges and are laced as at 23' to the girders, and also end to end to each other at the transverse frames 2. Corresponding catenary bands 16 are also provided for reinforcing the bottom sections 23, and the sealing strips are placed over the lacings.

Figure 6:
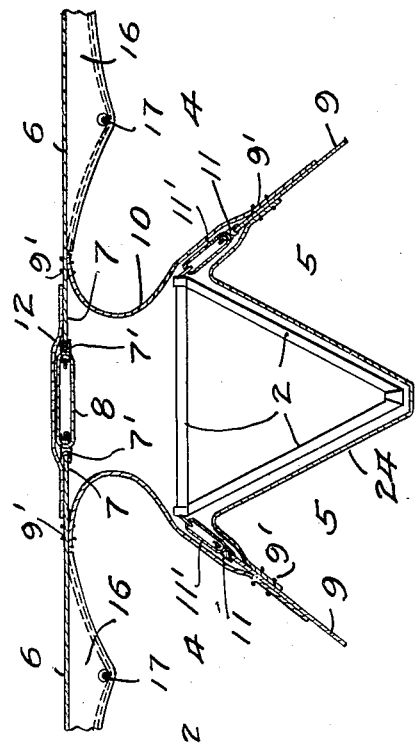
Fig. 6 is an enlarged longitudinal section showing the connections of the envelope and portion of one of the transverse frame members.

The lens-shaped gas cells 5 located at each bulkhead are bounded by the girders of the transverse frames 2, and are formed by sections 24 of balloon fabric extended around the inner sides of the girders of the frame 2 and secured so as to form a gas tight seam to the bulkheads 9 of the gas cells 4 as at 9' (see Fig. 6).

The gas cells 4 and 5 are to be supplied with gas in any well known manner and since this feature does not constitute the subject matter of this invention further description is omitted.

In the modified form of my invention, as will be seen with reference to Figs. 9 and 10, I have arranged the gas cells 26 so that they are located within the lines formed by the circumferential wires 17 on all four sides of the airship frame members 1. Sections of rubberized fabric 27, extending the length of the gas cells and between each of the transverse frame members 2, are joined end to end by lacing 28 and sealing strips 29, and are joined to inner gas cell fabric section 30 by a series of catenary bands 31 located at intervals lengthwise of the gas cells.

The gas cells are prevented from bulging by circumferential wires 32 which in this form are located at and secured to the intersections of the radius curves formed along the bands 31 and outside of the gas cell proper. The bottom 33 of the cell is free to move up as at 34 or rest along the line of the lower diagonal brace wires 3 depending upon the amount of gas pressure within the cell.

A series of brace wires 35 are located at each transverse frame which also limit the end movement of the gas cells.

Due to the arrangement of the local reinforcing members being located outside of the gas cells, air pressure is admitted between the outer cover or envelope 27 and the gas cells, as well as in the ballonet formed by the bottom 33, and insulation from the elements of the weather is provided which will restrict the fluctuation of pressure to a great extent.

Air chutes 36 are located outside of the lower girders of the longitudinal frame members 1, to supply the air for compensating for the varying gas pressure within the gas cells.

Gas-tight fabric sleeves 37 are provided in the gas cells where the diagonal brace wires 3 pass through the same.

It will be understood that the above description and accompanying drawings comprehend only the general and preferred embodiment of my invention and that minor detail changes in the construction and arrangement of parts may be made within the scope of the appended claims without sacrificing any of the advantages of my invention.

The invention herein described may be manufactured and used by or for the Government of the United States for governmental purposes without the payment to me of any royalty thereon or therefor.

Having thus described my invention, what I claim is:

1. In a rigid airship, gas containers, a frame comprising corresponding longitudinal girders and corresponding transverse girders outside of gas containers, and diagonal means passing through said gas containers for bracing said frame.

2. In a rigid airship, gas containers, a frame comprising corresponding longitudinal girders and corresponding transverse girders outside of said gas containers, and diagonal wires passing through said gas containers for bracing said frames.

3. In a rigid airship, gas containers, a frame comprising corresponding longitudinal girders and corresponding transverse girders outside of said gas containers, diagonal wires passing through said gas containers, and means for insuring gas tight joints where the diagonal wires pass through said gas containers.

4. In a rigid airship, gas containers, a frame comprising corresponding longitudinal girders and corresponding transverse girders, diagonal brace wires passing through said gas containers, for bracing said frame, reinforcing means carried by said gas containers for insuring local distribution of stresses with said gas containers.

5. In a rigid airship, gas containers, a frame comprising longitudinal girders and transverse frames, diagonal brace wires passing through said gas containers for bracing said frame, and reinforcing means carried by said gas container for insuring local distribution of stresses.

6. In a rigid airship, gas containers, a frame comprising principal longitudinal girders, and principal transverse frames, diagonal brace wires passing through said gas containers for bracing said frame, means carried by said gas containers for localizing the distribution of stresses comprising catenary bands lengthwise of said gas containers, and means for preventing bulging of said gas containers transversely.

7. In a rigid airship, gas containers, a frame comprising principal longitudinal girders, and principal transverse girders, diagonal brace wires passing through said gas containers for bracing said frame, catenary bands extending longitudinally along said gas containers, and adjustable means transversely to said catenary bands for governing the circumferential dimension of said gas cell.

8. In an airship, a gas containing envelope comprising a multiplicity of pressure compartments, a rigid frame comprising principal longitudinal frame members and transverse frame members, diagonal brace wires extending through said pressure compartments for bracing said rigid frame, and means for maintaining normal internal pressure within said envelope.

9. In an airship, a non-rigid envelope comprising a multiplicity of pressure compartments, a rigid frame composed of principal longitudinal girder members and principal transverse frame members, diagonal brace members extending through said envelope for bracing the frame, air chutes external of said frame for forcing air into the pressure compartments of said envelope.

10. In an airship, a flexible contour forming envelope comprising a multiplicity of pressure compartments, a rigid frame composed of corresponding longitudinal girders and corresponding transverse frames, diagonal wires passing through the pressure compartments of said envelope for bracing the frame, securing means along the outer edges of said longitudinal girders for fastening said envelope, and means for securing the pressure compartments of the envelope at the transverse frames to form a continuous streamline contour to the airship.

11. In an airship, a rigid frame, a non-rigid covering supported by said frame, a series of flexible partitions forming separate gas containers, lacing connections at the intersections of said partitions and certain of the members of said frame for securing said covering, flexible air compartments formed beneath alternates of said gas containers, air chutes for admitting air for automatically maintaining uniform pressure within all of said containers.

12. In an airship, a rigid frame, a non-rigid covering supported by said frame comprising a series of separate main gas cells, lacing connections at both ends of said main gas cells for securing them to each other and to certain members of said frame, diagonal members extending through said main gas cells for bracing said frame, flexible gas tight members at the intersections of said diagonal members and said main gas cells, intermediate gas cells interposed between said main gas cells forming compensating bulkheads for said main gas cells, air compartments within said main cells and air ducts connected to said air compartments for inflating said air compartments.

13. In an airship, a rigid frame comprising principal longitudinal girders and principal transverse girders for spacing the longitudinal girders apart, a series of separate main gas cells supported by said frame, the outer surfaces of which forming a non-rigid covering for the airship, lacing connections between the ends of each of said main gas cells whereby a continuous outer contour is obtained, diagonal brace members extending through said main gas cells for bracing said frame, gas tight members located at the intersections of said diagonal members and the said main gas cells, air compartments within said main gas cells having communicating air chutes exterior of the cell for maintaining uniform pressure of said main gas compartment, and intermediate gas cells between said main gas cells forming pressure compensating bulkheads.

CHARLES P. BURGESS.